3,004,052
PROCESS FOR THE RECOVERY OF URANIUM FROM SOLUTION BY MEANS OF CHELATION WITH A POLYOXIME ESTER RESIN
Robert B. Feild, Woodbury, N.J., assignor to E. I. du Pont de Nemours and Company, Wilmington, Del., a corporation of Delaware
No Drawing. Filed Apr. 2, 1959, Ser. No. 803,566
2 Claims. (Cl. 260—429.1)

The present invention relates to a method for the recovery of uranium from solutions containing dissolved uranyl salts. More particularly, the present invention relates to a method for extracting uranium from such sources as ore leaches, ore concentrates, and the like.

According to the present invention, uranium may be removed from a solution containing dissolved uranyl salts by contacting the solution with certain organic resins which I have found have a peculiar affinity for the uranyl ion. The resins which are used are those having 1,2-dioxime carboxylic ester repeat functions. At the proper pH values these resins have the ability to selectively absorb the uranyl ion notwithstanding the presence of other closely related metallic ions, such as ferrous, cupric, vanadyl, and nickelous ions.

In connection with the beneficiation of uranium-containing ores and minerals, is an object of the present invention to provide a novel process for recovering uranium from a solution containing dissolved uranyl salts notwithstanding the presence of other dissolved metallic salts. It is a further object of the present invention to provide such a process involving the use of certain organic resins which have a special selective affinity for the uranyl ion and which will function in the presence of even small amounts of the uranyl ion. Other and additional objects will become apparent from a consideration of the ensuing specification and claims.

As noted above, the process of the present invention involves the essential feature of contacting the solution containing dissolved uranyl salts at a prescribed pH with a resin containing 1,2-dioxime carboxylic ester repeat functions. These resins may be prepared by condensing an appropriate difunctional oxime with a polybasic acid chloride or the like, as described more particularly in co-pending application Serial No. 655,193 filed April 26, 1957, in the name of L. G. Donaruma and having a common assignee with the present application. A great many resins suitable for use in the present invention may be prepared by the general technique described in this last-named application. Any of a wide variety of difunctional oximes, such as glyoxime and derivatives thereof obtained by replacing the $\alpha$- and/or $\beta$-hydrogen atoms of glyoxime with organic radicals, may be reacted with the acid chloride of any common aliphatic or aromatic polycarboxylic acid. The preferred difunctional oxime is dimethyl glyoxime. The resin which results from such a condensation will have alternating dioxime and polycarboxylic acid residues, and will hereinafter frequently be referred to in this application as a "polyoxime ester." The structural nature of these polyoxime esters will be described in greater detail hereinafter.

I have found that the polyoxime esters referred to above have a special ability to selectively absorb uranyl ions by means of chelate linkages such that these resins can "take up" from solution even small amounts of uranium without picking up substantial quantities of other metals the salts of which may be present in the ore leach solution. The invention will be better understood from a consideration of the following examples.

*Example 1*

A uranium leach liquor containing the following ions in the concentrations given was adjusted to pH 4.0 (thereby precipitating $Fe^{+++}$, $Al^{+++}$, and $VO^{++}$).

| Ion: | Parts per thousand |
|---|---|
| $UO_2^{++}$ | 0.440 |
| $VO^{++}$ | 2.08 |
| $Ca^{++}$ | ~2 |
| $Mg^{++}$ | ~2 |
| $Fe^{+++}$ | 4 |
| $Al^{+++}$ | 4 |
| $SiO_2$ | 2 |

The liquor was filtered and 50 milliliters of the filtrate was slurried for a period of 45 minutes with 10 grams of poly(dimethylglyoxime terephthalate). The pH of the slurry was maintained at 4.0. The slurry was then filtered and the resin was eluted with 30 milliliters of 5% nitric acid. A solution containing 6.7 milligrams of $UO_2^{++}$ and <0.1 milligram of $Fe^{+++}$ and $VO^{++}$ was obtained.

The poly(dimethylglyoxime terephthalate) employed in this example was prepared as follows:

To a refluxing mixture of 60.8 grams (0.2 mole) of the disodium salt of dimethylglyoxime and 30 grams of magnesium sulfate slurried in 250 milliliters of chloroform was added, during a period of about 8 minutes, 40.6 grams (0.2 mole) of terephthaloyl chloride in approximately 100 milliliters of chloroform. The resulting mixture was heated at reflux for 4 hours, cooled, and then filtered. The solids were washed thoroughly with water and then slurried in 5% hydrochloric acid. The resulting mixture was filtered, and the solids were washed thoroughly with water and then dried overnight in vacuo at 60° C. The resin was then slurried in ether, and the slurry was filtered. The resin was washed thoroughly with ether and then dried in vacuo at 65° C. for 3 hours. A white resin (47 grams) having a melting point at least greater than 300° C. was obtained.

*Example 2*

The procedure of Example 1 was followed except that the filtrate from the uranium leach liquor (described in Example 1) was slurried with poly(dimethylglyoxime phthalate) instead of the terephthaloyl polyoxime ester. A solution was obtained which contained essentially the same amount of $UO_2^{++}$ as was obtained in Example 1.

The poly(dimethylglyoxime phthalate) employed in this example was prepared as follows:

To a refluxing mixture of 60.8 grams (0.2 mole) of the disodium salt of dimethylglyoxime and 30 grams of magnesium sulfate in 300 milliliters of chloroform was added, during a period of approximately 15 minutes, 40.6 grams (0.2 mole) of phthaloyl chloride. The resulting mixture was refluxed for 4 hours, cooled, and then filtered. The solids were air-dried, washed thoroughly with water, and then slurried in 5% hydrochloric acid. The slurry was filtered and the solids were washed thoroughly with water and then dried. The dried material was slurried and washed thoroughly with ether. The material then was placed in a Soxhlet extractor and extracted with ether for several hours. The resulting resin was dried in vacuo at 60° C. for 3 hours. A resin (37 grams) having a melting point at least greater than 300° C. was obtained.

To demonstrate the re-usability of the resins of Examples 1 and 2, further recycles with these same resin samples were made with fresh leach liquor in the same proportions. The seventh recycle using the terephthaloyl polyoxime ester yielded an eluate containing 6.5 milligrams of $UO_2^{++}$ while 12 milligrams of $UO_2^{++}$ were obtained from the phthaloyl polyoxime ester resin on the seventh recycle. Both eluates contained <0.1 milligram of Fe+++ and VO++.

*Example 3*

0.8 gram samples of poly(dimethylglyoxime sebacate) were slurried, at room temperature, in separate 100-milliliter solutions of 0.1 N potassium chloride containing $1 \times 10^{-3}$ mole of $Ni^{++}$, $Cu^{++}$, and $UO_2^{++}$ ion, respectively. The slurries were maintained at a pH of about 4.0. The resin picked up only $0.018 \times 10^{-3}$ mole (1.05 milligrams) of $Ni^{++}$ and $0.017 \times 10^{-3}$ mole (1.08 milligrams) of $Cu^{++}$, but absorbed $0.101 \times 10^{-3}$ mole (24 milligrams) of $UO_2^{++}$.

The procedure for preparing the poly(dimethylglyoxime sebacate) of this example was essentially the same as that used in preparing the polyoxime ester resins of Examples 1 and 2 except that the weights of the components were as follows: disodium salt of dimethylglyoxime, 30.4 grams (0.1 mole); sebacoyl chloride, 17.9 grams (0.075 mole); magnesium sulfate, 15 grams; and chloroform, 150 milliliters. The resin (15.5 grams) had a molecular weight of about 1320–1380 and a melting point of 119.5–121.5° C.

*Example 4*

Four portions (0.80 gram each) of the poly(dimethylglyoxime phthalate) resin of Example 1 were slurried for 60 minutes, in 100 milliliter portions of a 0.1 N potassium chloride solution containing $5 \times 10^{-4}$ mole of $Ni^{++}$, $Cu^{++}$, $UO_2^{++}$, or $VO^{++}$ ion, respectively. The pH of each solution was maintained at 4. The resin picked up $0.15 \times 10^{-3}$ mole (40 milligrams) of $UO_2^{++}$ and only $8 \times 10^{-6}$ mole (0.47 milligram) of $Ni^{++}$. The resin did not react with either the $Cu^{++}$ or $VO^{++}$ ion.

According to the present invention, it is possible to selectively remove the uranium from ore leach solutions containing dissolved uranyl salts notwithstanding the presence of other metallic salts by contacting the solution with a resinous polyoxime ester having 1,2-dioxime carboxylic ester repeat functions.

In general, the resin may be prepared by the reaction of an appropriate difunctional oxime with a polybasic acid chloride in the manner described in detail in the aforementioned prior copending application Serial No. 655,193. Polydimethyl glyoxime is the preferred difunctional oxime. This latter application describes the preparation of a class of polyoxime esters which may be represented as follows:

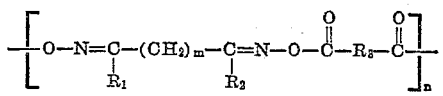

wherein each of "$R_1$" and "$R_2$" may be hydrogen, a lower alkyl radical, an aromatic radical, a heterocyclic radical, or wherein $R_1$ and $R_2$ are members of a single carbocyclic group; "$R_3$" may be a methylene radical, a polymethylene radical, an alkenyl radical, a phenylene radical, or wherein $R_3$ represents merely a direct carbon-to-carbon single bond between the two adjacent carbonyl groups; "$n$" is an integer greater than zero; and "$m$" is an integer less than two (including zero).

The contact of the resin with the solution of uranium salts must be within the pH range of about 2.5 to 8, and this is a critical feature of the invention. The preferred pH range for absorption of $UO_2^{++}$ is from about 3.5 to about 6. At a pH above about 8, the polyoxime ester resins tend to decompose. At pH values lower than about 2.5, the resin will not absorb uranyl ion and in fact herein lies the key to removing and separating the uranium ion which has been taken up by the resin. By dropping the pH value below about 2 with acid, such as hydrochloric, nitric acid, or the like, any uranyl ion which has been taken up by the resin will be stripped from the resin, and may be recovered from the eluate by conventional techniques. The resin itself is regenerated substantially unchanged, as is evidenced by the forgoing examples, and may be re-used.

These polyoxime ester resins have the special and peculiar ability to selectively take up uranyl ion from solutions containing dissolved uranyl salts notwithstanding the presence of other ions sometimes encountered in uranium ore leach solutions and the like, such as $VO^{++}$, $Ca^{++}$, $Mg^{++}$, $Fe^{+++}$, $Al^{+++}$, etc., as is evidenced by the foregoing examples. It will be readily apparent that the present invention provides a convenient technique for the beneficiation of uranium-containing ores and minerals since the process is selective for uranyl ion even in the presence of other metals of the type which may be found in uranium-bearing ores and minerals.

The precise manner in which the uranium-containing solution is contacted with the resin is not critical to the invention. For example, the resin may be prepared in the form of pellets, chips, briquettes, flakes, cubes, rods, or the like and loaded into a column, pan, bed, etc. through which the solution is made to pass. Depending upon the particular circumstances in each instance, the solution may be recycled one or more times through a single bed or the like, or it may be caused to flow through a series of such beds, or it may be slurried with the resin. The rate of flow employed in any instance will depend upon the concentration of the uranyl ion in the solution, the particular polyoxime ester resin being used, the amount and form of the resin, etc.

The process of the present invention represents a convenient and economical technique for extracting uranyl ion from a wide variety of uranium-containing solutions. Since the resins are regenerated without substantial change or loss, they may be re-used many times before replacement is necessary. Having thus described the invention it will be readily apparent to those skilled in the art that many variations of the compositions used and procedures described may be made without departing from the spirit of the invention. I therefore intend to be limited only by the following claims.

I claim:

1. A process for the beneficiation of uranium-containing ores and minerals which comprises contacting an ore leach with a polyoxime ester resin to absorb the uranium from the leach and thereafter treating the resin with dilute acid to strip the uranium from the resin, said polyoxime ester resin consisting essentially of repeat units having the following formula:

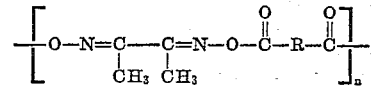

wherein "R" si a phenylene or a polymethylene radical and "$n$" is a whole number greater than one.

2. Uranyl chelates of polyoxime esters, said polyoxime esters consisting essentially of repeat units having the following formula:

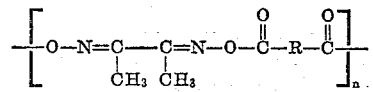

wherein "R" is a phenylene or a polymethylene radical and "$n$" is a whole number greater than one.

References Cited in the file of this patent

UNITED STATES PATENTS 2,892,855  Neville _____ June 30, 1959
2,902,503  Neville _____ Sept. 1, 1959
2,916,349  Crandall et al. _____ Dec. 8, 1959